United States Patent
Wayman et al.

[11] Patent Number: 5,710,846
[45] Date of Patent: Jan. 20, 1998

[54] SELF-CALIBRATING OPTICAL FIBER SWITCH

[75] Inventors: Richard Allen Wayman; Jerome Mike Truppa, both of San Jose, Calif.

[73] Assignee: RF Systems, Inc., San Jose, Calif.

[21] Appl. No.: 622,687

[22] Filed: Mar. 26, 1996

[51] Int. Cl.$^6$ .............................. G02B 6/26; H04B 10/08
[52] U.S. Cl. .......................... 385/17; 385/15; 385/16; 385/24; 359/109; 359/110
[58] Field of Search ................................ 385/15, 16, 17, 385/20, 24, 31, 39, 42; 359/109, 110, 127, 128, 177, 179

[56] References Cited

U.S. PATENT DOCUMENTS

| | | | |
|---|---|---|---|
| 3,630,617 | 12/1971 | Marrett et al. | 356/72 |
| 4,321,707 | 3/1982 | Beasley et al. | 356/73.1 |
| 4,381,881 | 5/1983 | Bell | 385/15 |
| 4,451,916 | 5/1984 | Casper et al. | 375/4 X |
| 4,637,072 | 1/1987 | Hellström | 324/96 |
| 4,708,422 | 11/1987 | Arnoux et al. | 356/73.1 |
| 4,798,435 | 1/1989 | Fujiwara et al. | 385/15 X |
| 4,811,210 | 3/1989 | Mc Aulay | 385/17 X |
| 4,998,791 | 3/1991 | Koai | 385/15 X |
| 5,002,354 | 3/1991 | Koai | 385/15 X |
| 5,013,113 | 5/1991 | Soref | 385/15 X |
| 5,033,846 | 7/1991 | Hernday et al. | 356/73.1 |
| 5,054,876 | 10/1991 | Grasso et al. | 385/24 |
| 5,069,521 | 12/1991 | Hardwick | 385/24 |
| 5,078,489 | 1/1992 | Lieber | 356/73.1 |
| 5,150,243 | 9/1992 | Suzuki | 359/110 |
| 5,159,190 | 10/1992 | Hohberg et al. | 250/227.24 X |
| 5,175,777 | 12/1992 | Bottle | 385/17 |
| 5,218,465 | 6/1993 | Lebby et al. | 359/110 |
| 5,229,875 | 7/1993 | Glista | 359/110 |
| 5,241,610 | 8/1993 | Labiche et al. | 385/16 |
| 5,245,681 | 9/1993 | Guignard et al. | 385/16 |
| 5,283,844 | 2/1994 | Rice et al. | 385/17 |
| 5,284,376 | 2/1994 | Zweigart | 296/96.19 |
| 5,299,293 | 3/1994 | Mestdagh et al. | 359/110 |
| 5,309,266 | 5/1994 | Jacobs et al. | 359/139 |
| 5,311,614 | 5/1994 | Caron et al. | 385/140 |
| 5,317,439 | 5/1994 | Fatehi et al. | 359/110 |
| 5,335,104 | 8/1994 | Johnson | 359/110 |
| 5,345,326 | 9/1994 | Araki | 359/117 |
| 5,353,363 | 10/1994 | Keck et al. | 385/46 |
| 5,400,339 | 3/1995 | Sekine et al. | 348/16 X |
| 5,428,471 | 6/1995 | McDermott | 359/177 |
| 5,446,809 | 8/1995 | Fritz et al. | 385/17 |
| 5,493,435 | 2/1996 | Philip et al. | 319/139 |
| 5,493,625 | 2/1996 | Glance | 385/16 X |
| 5,499,307 | 3/1996 | Iwatsuka | 385/11 |
| 5,542,010 | 7/1996 | Glance et al. | 385/14 |

*Primary Examiner*—Brian Healy
*Attorney, Agent, or Firm*—Nathan P. Koenig; Crosby, Heafey, Roach & May

[57] ABSTRACT

The present invention is a self-calibrating n×m optical routing switch which is controlled by a microprocessor to operate when signal condition degrades beyond user-definable thresholds. Preferably, the optical routing switch is a 2×2 or 1×2 device with an optical switch isolator to minimize crosstalk. In other embodiments, the optical routing switch output comprises the RF modulation carried by the input optical signal or the optical fiber input comprises a plurality of carrier wavelengths. A microprocessor compares real-time signal quality to a standard value and operates the switch when signal quality falls below a threshold value. Depending on the desired characteristics of the optical routing switch, the microprocessor controlled switch may comprise an optical switch, an optical switch isolator coupled to an optical switch, an optical switch isolator coupled to a wave division multiplexer, or an RF switch.

14 Claims, 6 Drawing Sheets

SELF-CALIBRATING OPTICAL FIBER SWITCH

TECHNICAL FIELD

The present invention relates to switches for optical fiber communication networks.

BACKGROUND

The need for increased data transmission has driven development of optical fiber communication networks that offer highly reliable, redundant systems. However, such systems are complicated by the difficulties of efficiently manipulating optical information. In particular, the equipment is very expensive and requires careful tuning. An integral component to redundant optical fiber networks is an n×m switch capable of efficiently switching optical signal from one fiber to another while minimizing insertional loss of power and cross talk. It is also important to be able to integrate the switches into an optical network with a minimum of setup and configuration. While the prior art does offer examples of n×m switches, they all suffer from certain drawbacks.

For example, U.S. Pat. No. 5,241,610 to Labiche et al. discloses a fiber optics network system employing 2×2 switches, but requires expensive spare equipment to backup the system. Similarly, U.S. Pat. No. 5,299,293 to Mestdagh et at. teaches a system where fault detection requires switching to a spare transmit/receive circuit. Finally, U.S. Pat. No. 5,317,439 to Fatehi et al. offers monitoring of an optical network, but requires that a reference low frequency modulation be imparted to the transmission. Moreover, conventional systems require extensive testing and calibration to integrate optical switches into a network.

Accordingly, there is a need for n×m optical switches which offer low optical loss and crosstalk, integrate quickly into the network, and provide backup without requiring spare equipment. The present invention fulfills these and other needs.

SUMMARY OF THE INVENTION

The present invention is a self-calibrating n×m optical routing switch comprising n optical inputs, means for sampling and comparing the input signals to a reference calibration, and a microprocessor controlling an output switch feeding m outputs, where n and m are positive integers. In a preferred embodiment, the optical routing switch is a 2×2 device further comprising an optical switch isolator. In another embodiment, the optical routing switch is a 1×2 device. In yet another embodiment, the output of the optical routing switch comprises the RF modulation carried by the input optical signal. In another embodiment, the optical routing switch comprises a optical fiber input having a plurality of carrier wavelengths.

Preferably, the means for sampling and comparing the input signals comprises means for resolving the input signal into signals representing the optical power and the RF power, means for storing reference values corresponding to proper network operation, and means for comparing the reference values to sampled signal quality during operation. The microprocessor operates the switch when sampled signal quality degrades by an amount greater than a preset threshold value. The thresholds may be set by the user or may be preprogramed in the microprocessor.

Depending on the desired characteristics of the optical routing switch, the microprocessor controlled switch may comprise an optical switch, an optical switch isolator coupled to an optical switch, an optical switch isolator coupled to a wave division multiplexer, or an RF switch. During operation, in either a normal or switched mode, the optical routing switch should exhibit very low loss. For example, a 2×2 optical switch with optical output should have insertional power loss of less than 1 dB and while in switched mode should have less than 3 dB of power loss.

DETAILED DESCRIPTION OF THE DRAWINGS

Figure 1:
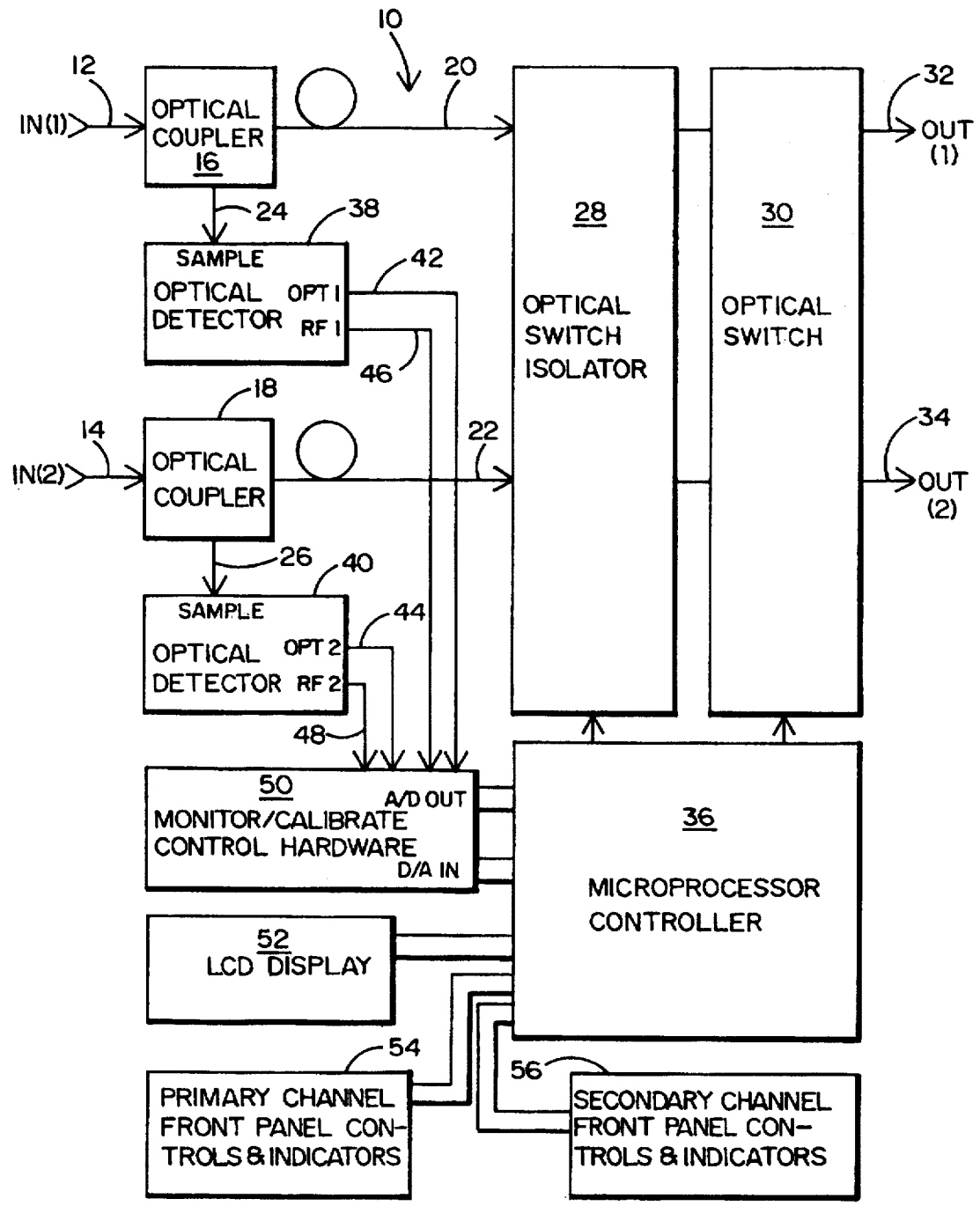
FIG. 1 is a block diagram illustrating the primary functional components of a 2×2 fiber optic switch of the invention.

FIG. 1 is a block diagram illustrating the primary functional components of a 2×2 redundant fiber optic routing switch 10 characteristic of the invention. Two optical input signals 12 and 14 feed into switch 10 through optical couplers 16 and 18. The function of the optical couplers is to split the input signal into the primary, low loss signals 20 and 22 and low level sample signals 24 and 26. The low loss signals 20 and 22 feed into optical switch isolator 28 and then into 2×2 optical switch 30. Input signal 12 is directed to output 32 while input 14 is directed to output 34, or either input 12 and 14 will be split and routed into both outputs 32 and 34, depending on the status of optical switch 30. Microprocessor 36 monitors the quality of signals 12 and 14 and controls optical switch isolator 28 and optical switch 30.

The sample signals 24 and 26 feed into optical detectors 38 and 40 which derive optical 42 and 44 and RF 46 and 48 components from the signals for processing by the monitor and calibration control hardware 50 and microprocessor 36. The status of switch 10 and desired operational parameters are displayed via LCD panel 52. The user may set threshold fault values for switch 10 through controls 54 and 56.

Optical switch 30 in normal mode passes each input signal 12 or 14 to its respective output 32 or 34 and in switched mode operates as a 3 dB optical coupler, splitting each input between both outputs. Preferably, switch 30 comprises a very low loss switch such as 2×2 Single Mode Optical Switch Model 1310-A-OV2950 or 1550-A-OV2950, available from Optivideo (Boulder, Colo. USA). Such switches may employ technology such as that disclosed in U. S. Pat. No. 5,353,363 to Keck et al., which is hereby incorporated in its entirety by reference. Since switch 30 provides low isolation (3 dB) in switched mode, optical switch isolator 28 is located upstream to increase the isolation of switch 30.

Figure 2:
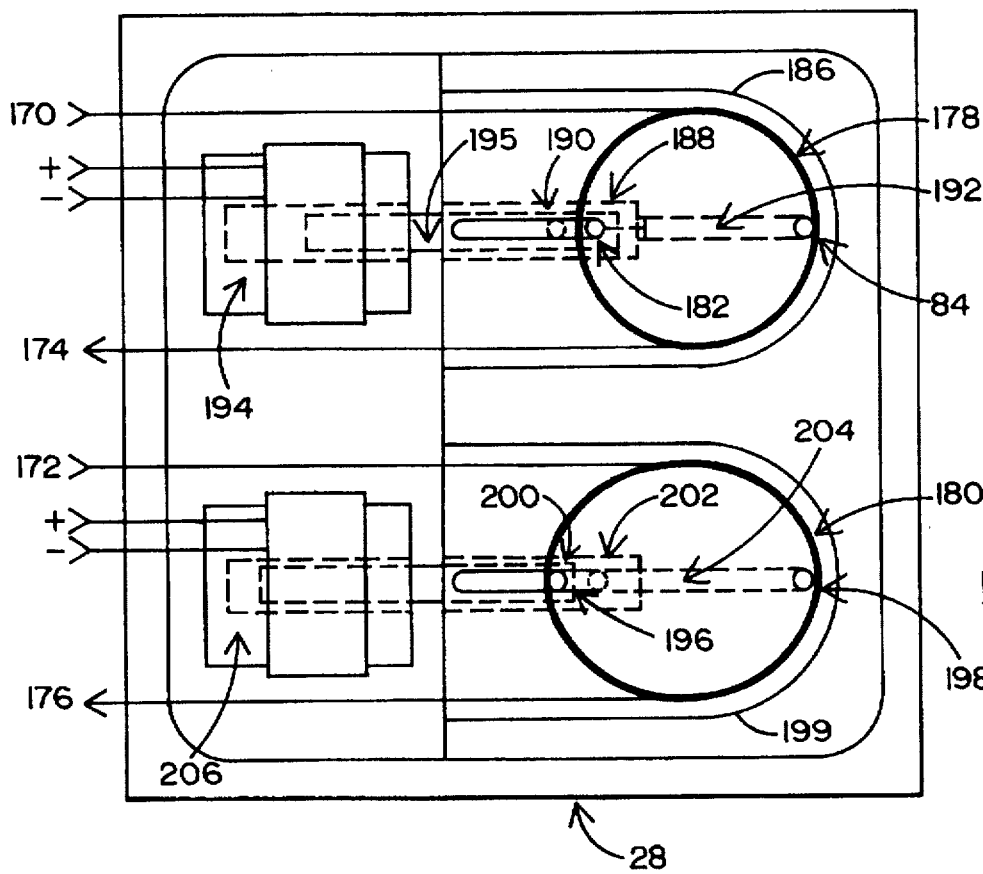
FIG. 2 illustrates the optical switch isolator of the invention.

FIG. 2 illustrates optical switch isolator 28 having two inputs 170 and 172 and two outputs 174 and 176. Each input and output pair, 170–174 and 172–176, is connected by a continuous loop of fiber optic cable 178 and 180. Referring first to fiber optic cable 178, it is looped around pins 182 and 184, and is generally constrained about its outer periphery by fiber loop housing 186. Pin 182 can slide between two set positions 188 and 190 (shown in phantom). Pin 182 is biased towards position 188 by tensioning spring 192. Pin 182 is also connected to solenoid 194 by actuator arm 195. When pin 182 is in position 188, the loop of fiber optic cable 178 is relatively relaxed and acts as a fiber mode stripper with low optical losses, preferably around 0.1 dB, and very low backreflection, preferably less than −70 dB. When solenoid 194 is activated, actuator arm 195 slides pin 182 to position 190, thus placing sufficient strain on the loop of fiber optic cable 178 to cause optical signal loss without damaging the fiber. In this position, optical isolation preferably exceeds 40 dB while maintaining very low backreflection.

In a preferred embodiment, optical switch isolator 28 has a plurality of receptacles (not shown) for pin 184. Depending on the wavelength of the optical signal transmitted, a different amount of bending of the optical fiber is required to produce the desired isolation. Therefore, the position of pin 184 can be adjusted to provide a loop of fiber such that the translocation of pin 182 from position 188 to position 190 will cause sufficient bending to produce the desired optical signal loss depending on the wavelength being transmitted.

The mechanisms controlling fiber optic cable 180 are the same as those for fiber optic cable 178. Fiber optic cable 180 is looped around pins 196 and 198 within housing 199. Pin 196 slides between positions 200 and 202 (shown in phantom) and is tensioned by spring 204 against the control of solenoid 206.

Preferably, the solenoids 194 and 206 comprise latching solenoids so that they retain their position when current is not supplied to the solenoid coils. This feature adds to the reliability of the optical switch isolator 28 which is also characterized by its ease of manufacture and relatively few moving parts. The isolator 28 has been described with reference to loops of fiber optic cable, but other flexible waveguides are also suitable. The function of the optical switch isolator 28 could be simulated, although not as effectively, by a series of conventional 1×2 optical switches. These switches, however, are prohibitively expensive and typically cause an insertional signal loss of about 1 dB. Further, the switches typically rely on mechanically breaking or closing the optical fiber path, and correspondingly, have poor optical return loss and back-reflection characteristics. They do not offer the low insertional loss, ease of manufacture or reliability of the optical switch isolators of the invention.

Figure 3:
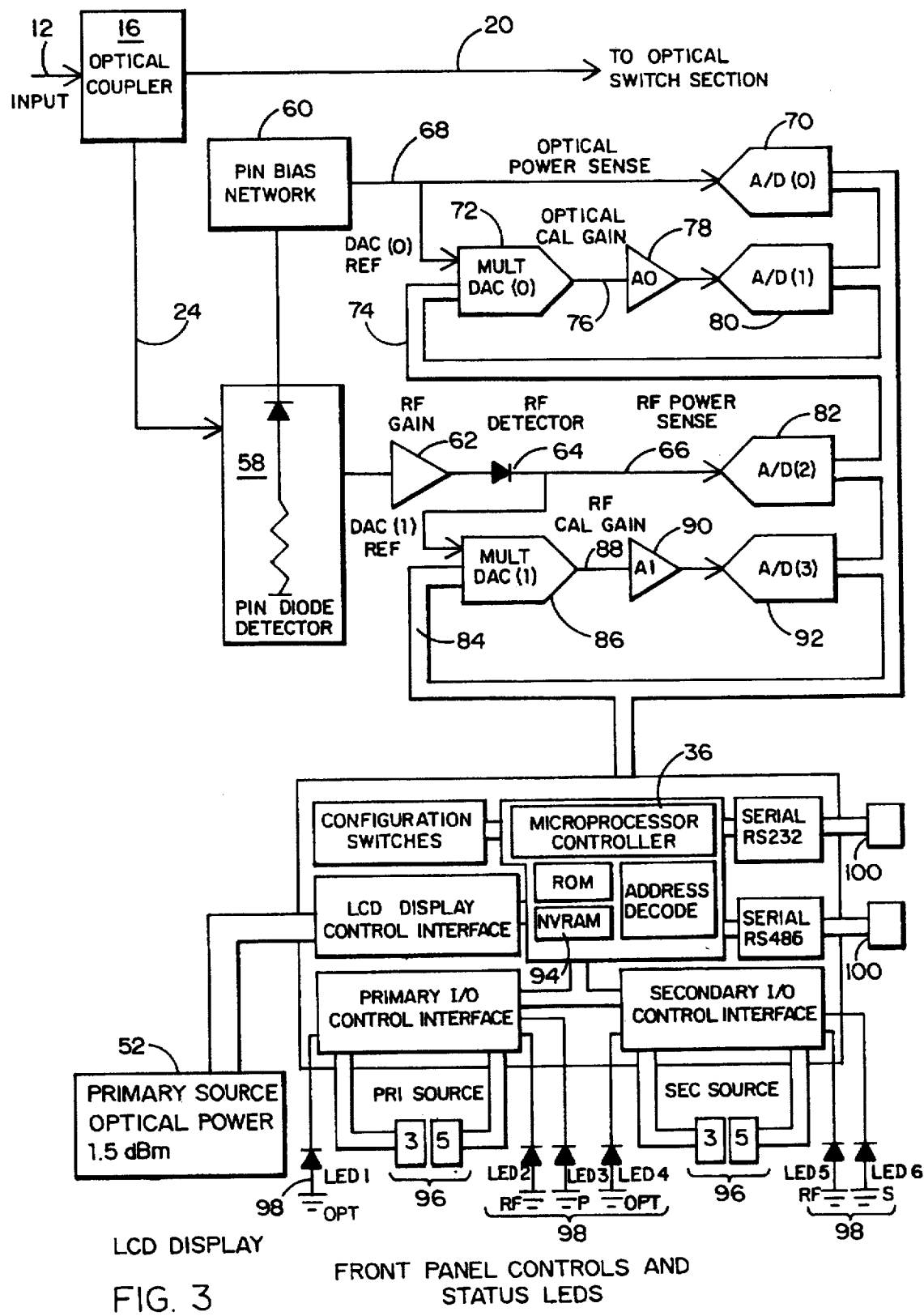
FIG. 3 is a block diagram detailing the operation of the monitor and calibration control of optical switches of the invention.

FIG. 3 is a block diagram detailing the operation of monitor and calibration control hardware 50 and microprocessor 36. For simplicity, only input signal 12 is diagramed but input signal 14 is processed in an identical manner. Sample signal 24, the coupled output of optical coupler 16, feeds into pin diode detector 58 which is biased by pin bias network 60. Signal 12 passes from pin diode detector 58 and is amplified by RF gain 62. RF detector 64 then generates directly proportional RF power sense signal 66. Similarly, pin bias network 60 generates directly proportional optical power sense signal 68.

Optical power sense signal 68 is buffered, sampled and digitized by A/D converter 70. Optical power sense signal 68 also feeds into multiplying DAC 72 along with microprocessor generated reference signal 74 and the combined optical signal 76 passes through buffer amplifier 78 and is sampled and digitized by A/D converter 80. RF power sense signal 66 is processed in the same manner by A/D converter 82 and also is combined with microprocessor generated signal 84 by multiplying DAC 86. The combined RF signal 88 is buffered by amplifier 90 and converted to digital by A/D converter 92.

Internal calibration of switch 10 occurs when microprocessor 36 controls multiplying DACs 72 and 86 to force the analog output of amplifiers 78 and 90 to the center of the range of the A/D converters 80 and 92. The corresponding values sent to multiplying DACs 72 and 86 are stored in non volatile RAM 94 as the calibration references. Failure thresholds may be set by the user through controls 96. Operation of switch 10 may be monitored by LCD display 52 and LEDs 98 which display the status of the switch as well as operational characteristics of the optical network. Switch 10 may also have conventional serial ports 100 such as RS232 or RS485 ports for remote monitoring.

In operation, microprocessor 36 constantly monitors the output of A/D converters 80 and 92 and compares the value to the stored calibration references. If signal 12 or 14 falls below the calibration reference by an amount greater than the programmed threshold, microprocessor 36 directs optical switch isolator 28 and optical switch 30 to operate in switched mode, splitting the good signal between outputs 32 and 34 while isolating the bad signal. Preferably, controls 96 offer a range of adjustment over a 10 dB range although different ranges of adjustment are suitable.

Figure 4:
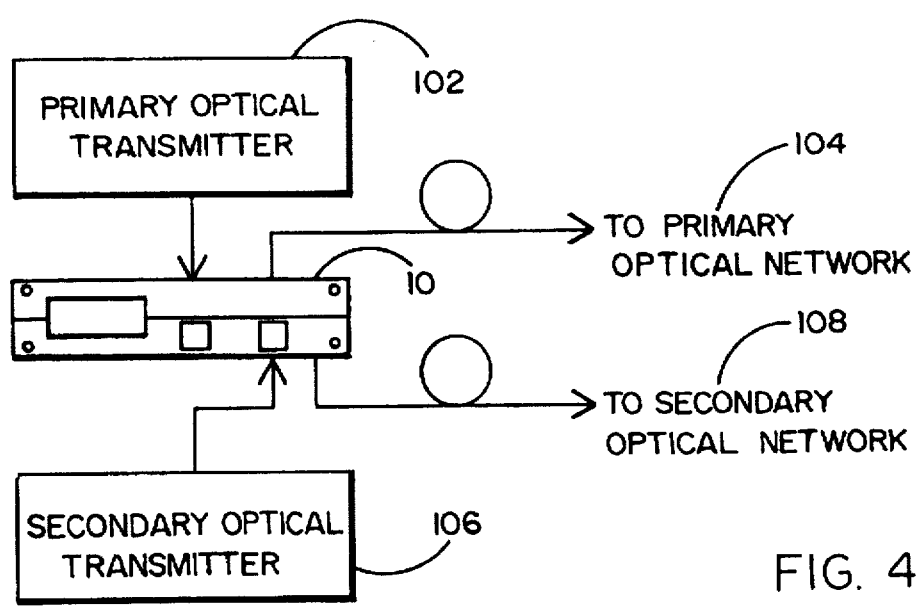
FIG. 4 shows a schematic of one type of redundant network configuration employing 2×2 switches.

FIG. 4 shows a schematic of one type of redundant network configuration employing redundant fiber optic switches 10. Under normal circumstances, primary optical transmitter 102 supplies signal to primary optical network 104 while secondary optical transmitter 106 supplies secondary optical network 108. In this configuration, signal power loss is less than 1 dB. If the signal from either transmitter 102 or 106 should fall beneath the programmed threshold value, switch 10 will cause the signal from the good transmitter to be split between the two networks 104 and 108 with only a 3 dB loss of power to each network while isolating the failed transmitter. Under this configuration, all the equipment is in use during normal operation, minimizing equipment costs and maximizing network efficiency, yet the network is still fully backed up should one transmitter fail.

Figure 5:
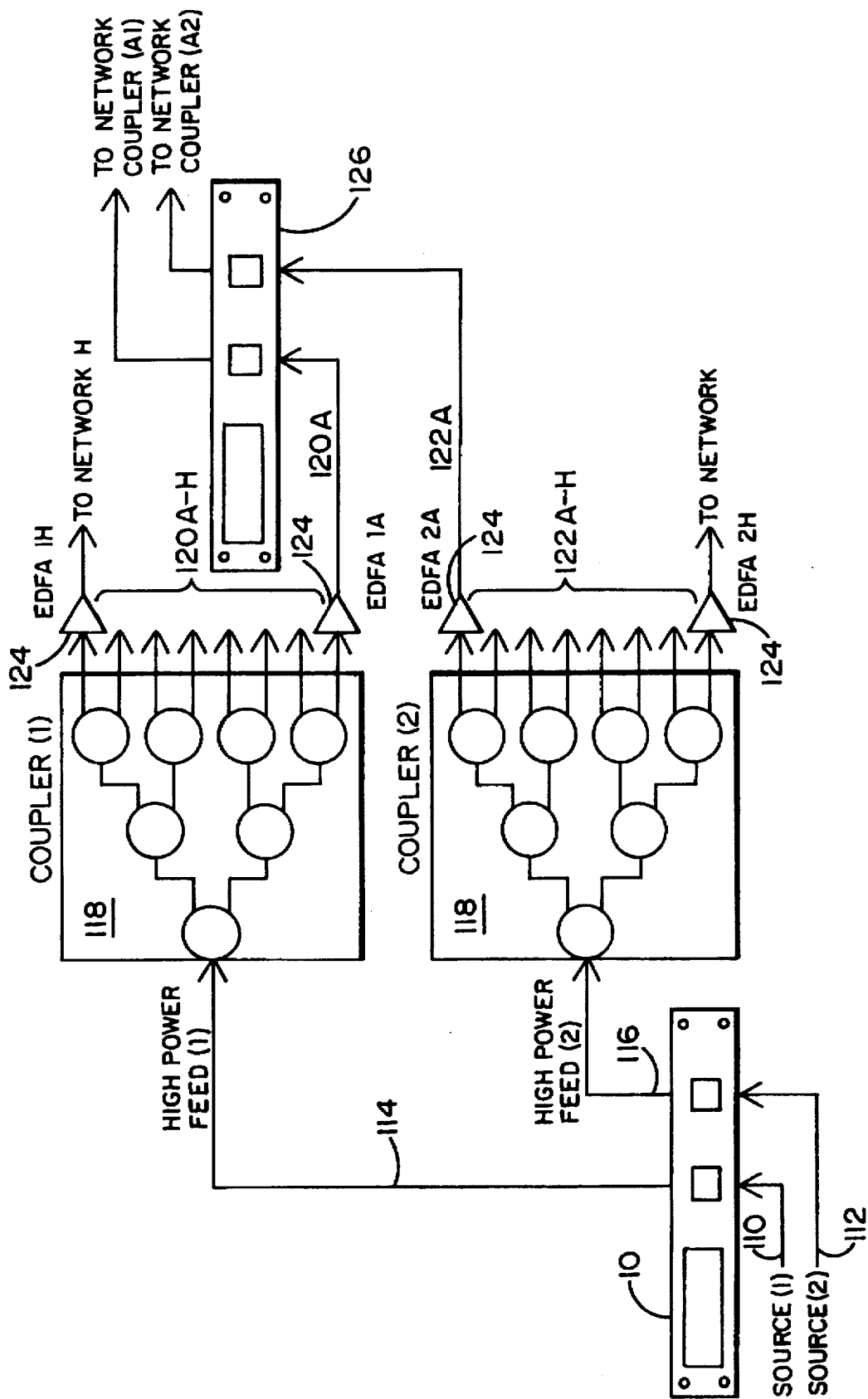
FIG. 5 shows a schematic of another, more complex, redundant network configuration employing 2×2 switches.

A more complex network configuration is schematically shown in FIG. 5. Input sources 110 and 112 are routed through optical switch 10. The two outputs 114 and 116 channeled into optical couplers 118 which split the signal a desired number of times, here eight. Each output 120A-H and 122A-H is amplified by erbium doped fiber amplifier 124 and then each pair 120 and 122 is fed into a second optical switch 126. Thus, the network system is fully monitored and backed up; any failure is compensated and the faulty signal is isolated. The very low loss of switches 10 and 126 allows this type of network strategy. Moreover, one of skill in the art will quickly recognize the flexibility inherent in the switches and could easily design other advantageous networks.

Figure 6:
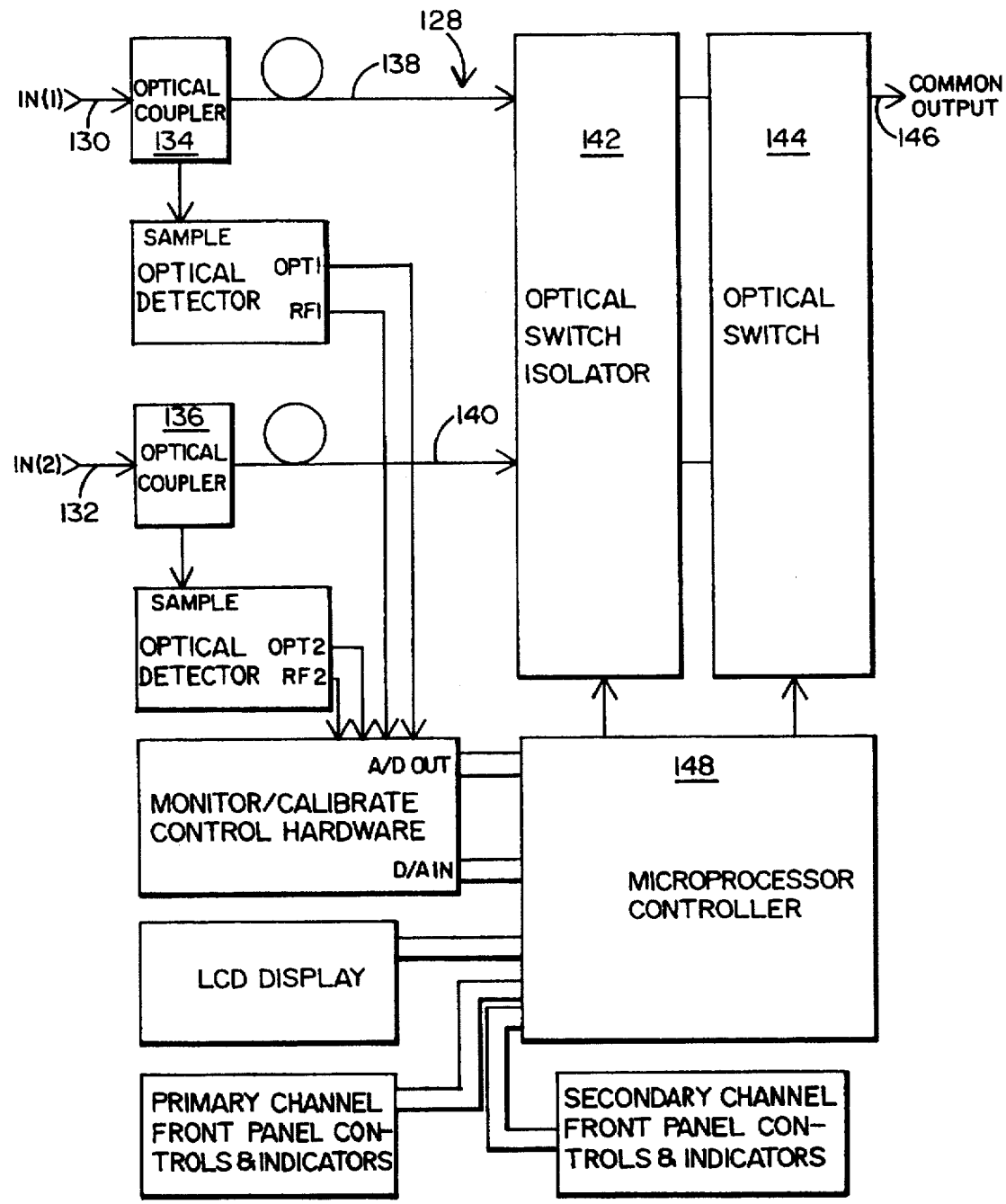
FIG. 6 is a block diagram showing the functional components of an alternate embodiment of the invention employing a 1×2 optic switch.

An alternate embodiment of the invention employs a 1×2 redundant optic switch 128 as shown in FIG. 6. Optical input signals 130 and 132 feed into switch 128 through optical couplers 134 and 136. The low loss signals 138 and 140 from the couplers feed into optical switch isolator 142 and then into 1×2 optical switch 144. Either input signal 130 or input signal 132 is directed to output 146, depending on the status of optical switch 144. Microprocessor 148 monitors the quality of signals 130 and 132 and controls optical switch isolator 142 and optical switch 144. The control and calibration of switch 128 is as described above with reference to switch 10. In this embodiment, power loss is preferably limited to less than 1 dB in both normal and switched states.

Figure 7:
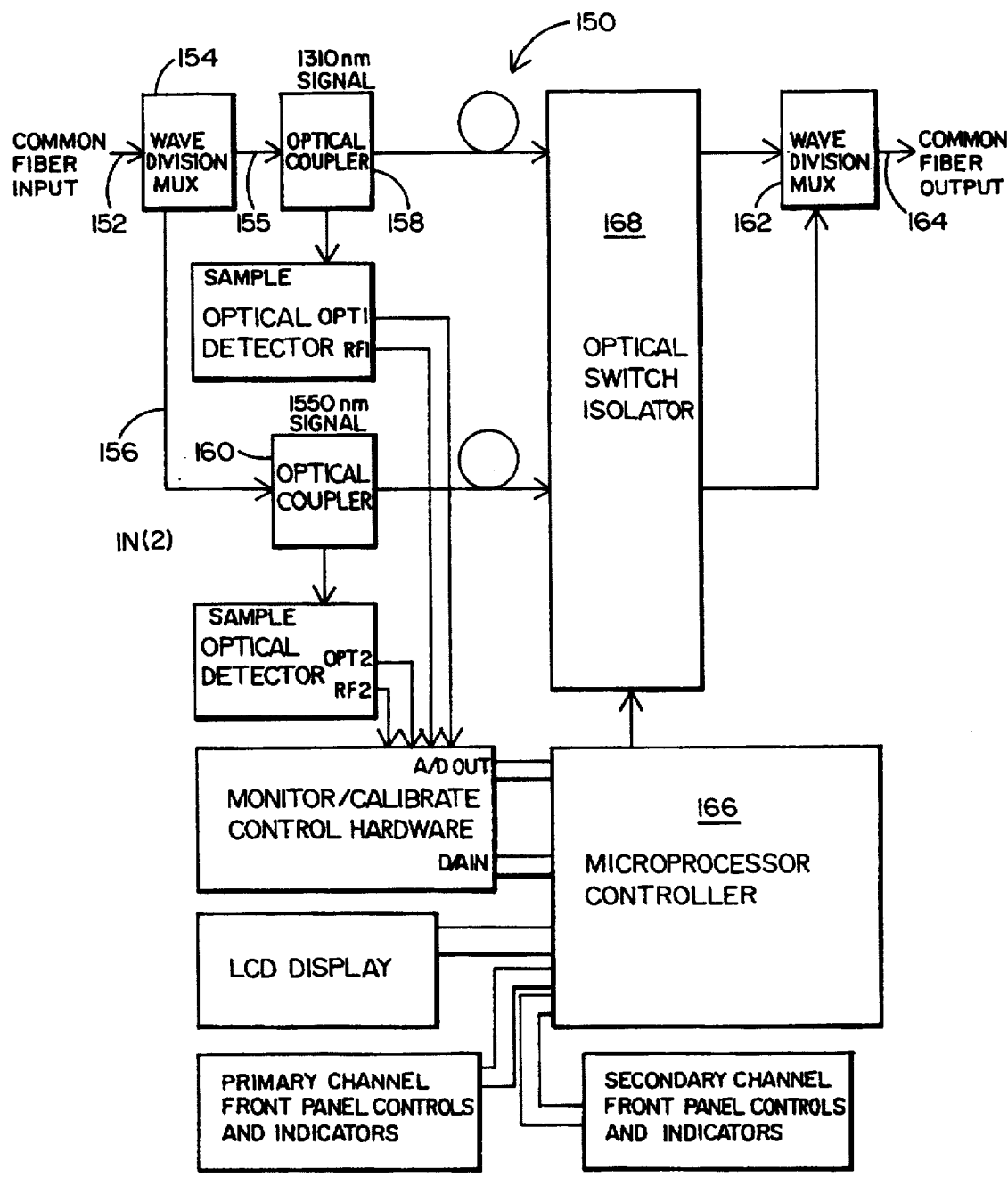
FIG. 7 is a block diagram showing the functional components of an alternate embodiment of the invention employing switching between two carrier wavelengths on the same optical fiber.

Another embodiment, redundant wavelength switch 150, is shown in FIG. 7 which allows for switching between two carrier wavelengths on the same optical fiber. Optical input signal 152 feeds into wave division multiplexer 154 which divides the signal 152 into 1310 nm signal 155 and 1550 nm signal 156 through optical 158 and 160. The low loss 1310 nm signal 155 and 1550 nm signal 156 from the couplers feed into optical switch isolator 168 and then into a second wave division multiplexer 162 which feeds them onto a common output fiber 164. As in the other embodiments, microprocessor 166 monitors the quality of the 1310 nm signal 154 and the 1550 nm signal 156 while controlling optical switch isolator 168. The control and calibration of switch 150 is similar to that of switch 10. If the system detects a faulty signal on either carrier wavelength, microprocessor 166 causes optical switch isolator 168 to prevent the bad signal from passing through into the second wave division multiplexer 162.

In another embodiment of the invention, a switch (not shown) comprising a redundant optical receiver is very similar to the 2×2 optical switch 10 shown in FIG. 1. However, since the switch is configured to output RF signals, the optical switch isolator and optical switch are not necessary and an RF switch, a 1×2 device, for example, may be used. In such an embodiment, the RF modulation signals 46 and 48 from optical detectors 38 and 40 are routed directly in to the RF switch which is controlled by microprocessor 36. The monitoring aspects of this embodiment are comparable to the above examples.

Although the invention has been described in reference to presently preferred embodiments, one of skill in the art would recognize certain modifications and additions that are within the scope of the invention. In particular, the optical routing switches of the invention may have any suitable n×m configuration. The outputs of the switches may be either a pass through of the optical signals or may comprise the RF modulation carried by the optical wavelengths. Also, the inputs and outputs may comprise a plurality of optical wavelengths carried by one or more wave guides.

What is claimed is:

1. A self-calibrating n×m optical routing switch comprising:
   a) n optical input signals,
   b) means for sampling and comparing the input signals to a reference calibration, and
   c) a microprocessor controlling an output switch feeding the input signals into m outputs,
   where n and m are positive integers.

2. The self-calibrating n×m optical routing switch of claim 1, further comprising an optical switch isolator operatively coupled to the output switch.

3. The self-calibrating n×m optical routing switch of claim 2, wherein the optical switch isolator comprises:
   a) an input and an output connected by a flexible waveguide; and
   b) means for bending the flexible waveguide from a first configuration to a
   second configuration;
   wherein the flexible waveguide is in a low loss mode when in the first configuration and is in a high isolation mode when in the second configuration.

4. The self-calibrating n×m optical routing switch of claim 3, wherein the flexible waveguide comprises a fiber optic cable looped about two pins separated by a first distance and the means for bending the flexible waveguide comprises a solenoid operatively connected to one of the pins such that operation of the solenoid causes the pins to be separated by a second distance.

5. The self-calibrating n×m optical routing switch of claim 3, wherein the optical switch isolator is characterized by having an optical loss of about 0.1 dB and a backreflectance of less than about −70 dB when in low loss mode and by having an optical loss of greater than about 40 dB when in high isolation mode.

6. The self-calibrating n×m optical routing switch of claim 2, wherein n and m equal 2.

7. The self-calibrating n×m optical routing switch of claim 3, wherein n and m equal 2, comprising a first and second input and a first and second output such that the optical routing switch, when operating in a normal mode, connects the first input with the first output and the second input with the second output with an optical loss of less than 1 dB and, when operating in a switched mode, connects an output selected from the group consisting of the first input and the second input with the first output and the second output with an optical loss of less than 3 dB.

8. The self-calibrating n×m optical routing switch of claim 2, wherein n equals 2 and m equals 1.

9. The self-calibrating n×m optical routing switch of claim 3, wherein n equals 2 and m equals 1, comprising a first and second input and a first output such that the optical routing switch, when operating in a normal mode, connects the first input with the first output with an optical loss of less than 1 dB and, when operating in a switched mode, connects the second input with the first output with an optical loss of less than 1 dB.

10. The self-calibrating n×m optical routing switch of claim 2, wherein the output switch comprises a wave division multiplexer and the optical input signal comprises a plurality of carrier modulation wavelength on one wave guide.

11. The self-calibrating n×m optical routing switch of claim 1, wherein the m outputs comprise RF modulations carried by the optical input signals and the output switch comprises an RF switch.

12. The self-calibrating n×m optical routing switch of claim 1, wherein the means for sampling and comparing the input signals to a reference calibration comprises:
   a) an optical coupler for dividing each n input signal into a low loss signal and a sample signal,
   b) an optical detector for resolving the sample signal into an optical component and an RF component,
   c) means for storing a reference value corresponding to nominal operation, and
   d) means for comparing the reference value to a value obtained from operational signal condition;
   wherein the microprocessor is configured to control the operation of the optical switch based upon the result of the comparison.

13. The self-calibrating n×m optical routing switch of claim 12, further comprising user selectable input control configured to set a threshold, wherein the microprocessor activates the output switch when the value obtained from operational signal comparison falls outside the threshold with respect to the reference value.

14. The self-calibrating n×m optical routing switch of claim 1, wherein the output switch is selected from the group comprising an optical switch, an optical switch isolator operatively coupled to an optical switch, an optical switch isolator operatively coupled to a wave division multiplexer, and an RF switch.

* * * * *